US008649046B2

(12) United States Patent
Ikeda et al.

(10) Patent No.: US 8,649,046 B2
(45) Date of Patent: Feb. 11, 2014

(54) SELECTIVELY DISPLAYING AND PROCESSING IMAGE PROCESSING LOAD

(75) Inventors: Hiroki Ikeda, Osaka (JP); Yoshinori Nagata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 210 days.

(21) Appl. No.: 13/235,742

(22) Filed: Sep. 19, 2011

(65) Prior Publication Data

US 2012/0075668 A1    Mar. 29, 2012

(30) Foreign Application Priority Data

Sep. 28, 2010 (JP) .................................. 2010-217344

(51) Int. Cl.
*G06F 3/12* (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

| 2004/0190045 | A1 | 9/2004 | Matsuhara et al. | |
| 2007/0005296 | A1* | 1/2007 | Beresniewicz et al. | 702/181 |
| 2007/0035765 | A1* | 2/2007 | Corona | 358/1.15 |
| 2009/0193423 | A1* | 7/2009 | Ruemmler et al. | 718/102 |
| 2010/0123726 | A1* | 5/2010 | Ito | 345/501 |
| 2010/0141990 | A1 | 6/2010 | Yamada | |

FOREIGN PATENT DOCUMENTS

| JP | 11-213143 A | 8/1999 |
| JP | 2004-297392 A | 10/2004 |
| JP | 2006-235068 A | 9/2006 |
| JP | 2007-312166 A | 11/2007 |
| JP | 2008-160816 A | 7/2008 |
| JP | 2010-141390 A | 6/2010 |

* cited by examiner

*Primary Examiner* — Eric A Rust
(74) *Attorney, Agent, or Firm* — Renner, Otto, Boisselle & Sklar, LLP

(57) ABSTRACT

An image processing system disclosed is arranged to (i) when an image processing apparatus has received document image data and image processing request information for the document image data, cause a display section of the image processing apparatus to display an execution/non-execution selection screen for allowing a user to select whether to carry out an image processing corresponding to the image processing request information and (ii) upon acceptance of an instruction from the user to carry out the image processing corresponding to the image processing request information, carry out, with respect to the document image data, the image processing corresponding to the image processing request information.

13 Claims, 5 Drawing Sheets

SELECTIVELY DISPLAYING AND PROCESSING IMAGE PROCESSING LOAD

This Nonprovisional application claims priority under 35 U.S.C. §119(a) on Patent Application No. 2010-217344 filed in Japan on Sep. 28, 2010, the entire contents of which are hereby incorporated by reference.

TECHNICAL FIELD

The present invention relates to (i) an image processing system including: an image scanning apparatus which scans a document to obtain image data; and an image processing apparatus which carries out an image processing with respect to image data, the image scanning apparatus and the image processing apparatus being communicably connected to each other via a communication network, (ii) an image processing apparatus included in the image processing system, and (iii) an image processing method used in the image processing system.

BACKGROUND ART

There has been known an image processing system including an image processing apparatus which carries out a predetermined image processing with respect to image data received via a communication network.

Patent Literature 1, for example, discloses an image processing apparatus which carries out, in accordance with an instruction from a client terminal, a plurality of different image processings with respect to image data received from the client terminal.

CITATION LIST

Patent Literature 1
Japanese Patent Application Publication, Tokukai, No. 2004-297392 A (Publication Date: Oct. 21, 2004)
Patent Literature 2
Japanese Patent Application Publication, Tokukai, No. 2006-235068 A (Publication Date: Sep. 7, 2006)
Patent Literature 3
Japanese Patent Application Publication, Tokukai, No. 2008-160816 A (Publication Date: Jul. 10, 2008)
Patent Literature 4
Japanese Patent Application Publication, Tokukaihei, No. 11-213143 A (Publication Date: Aug. 6, 1999)

SUMMARY OF INVENTION

Technical Problem

The technique of Patent Literature 1, however, has the following problem: When the image processing apparatus has received image data and an image processing request from a client terminal, the image processing apparatus automatically starts an image processing with respect to the image data. Thus, in a case where the image processing apparatus is being used by a second user, a process being carried out by the second user may (i) have a long processing time or (ii) be delayed.

The present invention has been accomplished to solve the above problem. It is an object of the present invention to, in an image processing system including an image scanning apparatus and an image processing apparatus which is communicably connected to the image scanning apparatus via a communication network and which carries out an image processing in response to an image processing request from the image scanning apparatus, reduce a disadvantage from which a user using the image processing apparatus suffers, the disadvantage arising from the image processing apparatus automatically starting an image processing in response to an image processing request from the image scanning apparatus.

Solution to Problem

In order to solve the above problem, an image processing apparatus of the present invention is an image processing apparatus for (i) receiving, from a second device connected thereto via a communication network, document image data and image processing request information indicative of content of an image processing to be carried out with respect to the document image data and (ii) carrying out, with respect to the document image data, the image processing corresponding to the image processing request information, the image processing apparatus including: display means for displaying information to be presented to a user of the image processing apparatus; instruction entry means for accepting an instruction entry from the user of the image processing apparatus; an image processing section for carrying out an image processing with respect to image data; and a UI screen preparation section for, upon receipt of image processing request information, causing the display means to display an execution or non-execution selection screen for allowing the user of the image processing apparatus to select whether to carry out an image processing corresponding to the image processing request information, when the instruction entry means has accepted from the user of the image processing apparatus an instruction to carry out the image processing corresponding to the image processing request information, the image processing section carrying out, with respect to document image data, the image processing corresponding to the image processing request information.

According to the above arrangement, when the image processing apparatus has received image processing request information, the UI screen preparation section causes the display means to display an execution/non-execution selection screen for allowing a user of the image processing apparatus to select whether to carry out an image processing corresponding to the image processing request information. The image processing section, upon acceptance of an instruction from the user of the image processing apparatus to carry out the image processing corresponding to the image processing request information, carries out, with respect to document image data, the image processing corresponding to the image processing request information.

The above arrangement allows the user of the image processing apparatus to determine whether to carry out the image processing corresponding to the image processing request information. The arrangement consequently prevents the user of the image processing apparatus from suffering from a disadvantage arising from an automatic start of the image processing corresponding to the image processing request information.

The image processing apparatus may further include: a processing load calculation section for calculating an estimated processing load caused in a case where the image processing corresponding to the image processing request information is carried out, wherein: the UI screen preparation section causes the display means to display the estimated processing load.

The above arrangement allows the user of the image processing apparatus to refer to the estimated processing load, displayed by the display means, in determining whether to carry out the image processing corresponding to the image processing request information.

The image processing apparatus may be arranged, for example, such that the image processing section includes a CPU included in the image processing apparatus, the CPU executing an image processing application program for carrying out an image processing with respect to image data; and the processing load calculation section calculates an estimated CPU utilization rate as the estimated processing load, the estimated CPU utilization rate being a value estimated of a rate of utilization of the CPU for the case where the image processing corresponding to the image processing request information is carried out.

The image processing apparatus may be arranged such that the image processing section includes a CPU included in the image processing apparatus, the CPU executing an image processing application program for carrying out an image processing with respect to image data; and the processing load calculation section (i) calculates an estimated CPU utilization rate, which is a value estimated of a rate of utilization of the CPU for the case where the image processing corresponding to the image processing request information is carried out, and (ii) compares the calculated estimated CPU utilization rate with at least one preset threshold so as to determine, from among a plurality of preset load levels, a load level for the estimated CPU utilization rate in order to calculate an estimated load level as the estimated processing load, the estimated load level being the determined load level.

The image processing apparatus may be arranged such that the processing load calculation section calculates an estimated processing time as the estimated processing load, the estimated processing time being a value estimated, for the case where the image processing corresponding to the image processing request information is carried out, of a processing time required for the image processing.

The image processing apparatus may be arranged such that the image processing section includes a CPU included in the image processing apparatus, the CPU executing an image processing application program for carrying out an image processing with respect to image data; and the processing load calculation section calculates, as the estimated processing time, a value estimated of a processing time for the image processing corresponding to the image processing request information for a case where the user of the image processing apparatus (i) is causing the CPU to carry out a second processing, which is a processing other than the image processing corresponding to the image processing request information, and (ii) causes the CPU to carry out in parallel the image processing corresponding to the image processing request information and the second processing.

The image processing apparatus may be arranged such that the image processing section includes a CPU included in the image processing apparatus, the CPU executing an image processing application program for carrying out an image processing with respect to image data; and the processing load calculation section calculates an estimated delay time as the estimated processing load, the estimated delay time being a value estimated of a difference between (A) a first estimated processing time for a second processing, which is a processing other than the image processing corresponding to the image processing request information, for a case where the user of the image processing apparatus (i) is causing the CPU to carry out the second processing and (ii) causes the CPU to carry out in parallel the image processing corresponding to the image processing request information and the second processing and (B) a second estimated processing time for the second processing for a case where the user of the image processing apparatus causes the CPU to carry out the second processing without carrying out the image processing corresponding to the image processing request information.

The image processing apparatus may be arranged such that in a case where the estimated processing load calculated by the processing load calculation section satisfies a preset predetermined condition, (i) the UI screen preparation section does not cause the display means to the display the execution or non-execution selection screen, and (ii) the image processing section carries out, without waiting for the instruction from the user to carry out the image processing corresponding to the image processing request information, the image processing corresponding to the image processing request information.

The above arrangement allows an immediate start of the image processing, corresponding to the image processing request information, in the case where the estimated processing load satisfies a preset predetermined condition. The arrangement thus makes it possible to rapidly carry out the image processing corresponding to the image processing request information. The arrangement allows an immediate start of the image processing, corresponding to the image processing request information, in a case where, for example, the estimated processing load is small, and thus even if the image processing apparatus is being used for a second processing, the image processing will not much affect the second processing.

The image processing apparatus may be arranged such that the UI screen preparation section causes the display means to display information attendant to the document image data received from the second device connected to the image processing apparatus via the communication network; and the attendant information includes at least one of (A) user information indicative of a user who has made an image processing request for the document image data, (B) information indicative of a severity set by the user who has made the image processing request for the document image data, (C) size information indicative of a size of a document in the document image data, (D) document count information indicative of a number of a sheet included in the document in the document image data, (E) resolution information indicative of resolution of the document image data, (F) format information indicative of a format of the document image data, (G) time information indicative of a time at which a scanning process for the document image data was carried out, and (H) information indicative of whether the document in the document image data has an image on each side or on a single side.

The above arrangement allows the user of the image processing apparatus to determine, on the basis of the information attendant to the document image data, whether to carry out the image processing corresponding to the image processing request information.

The image processing apparatus may be arranged such that in a case where information attendant to the document image data received from the second device connected to the image processing apparatus via the communication network satisfies a preset predetermined condition, (i) the UI screen preparation section does not cause the display means to the display the execution or non-execution selection screen, and (ii) the image processing section carries out, without waiting for the instruction from the user to carry out the image processing corresponding to the image processing request information, the image processing corresponding to the image processing request information; and the attendant information includes at least one of (A) user information indicative of a user who has made an image processing request for the document image data, (B) information indicative of a severity set by the user who has made the image processing request for the document image data, (C) size information indicative of a size of a document in the document image data, (D) document count information indicative of a number of a sheet included in the document in the document image data, (E) resolution information indicative of resolution of the document image data, (F) format information indicative of a format of the document image data, (G) time information indicative of a time at which a scanning process for the document image data was carried out, and (H) information indicative of whether the document in the document image data has an image on each side or on a single side.

The above arrangement allows the image processing corresponding to the image processing request information to immediately start if the attendant information satisfies a preset predetermined condition. The arrangement thus makes it possible to rapidly carry out the image processing corresponding to the image processing request information. The arrangement allows an immediate start of the image processing, corresponding to the image processing request information, in a case where, for example, (i) a user who has made an image processing request at the image scanning apparatus is a particular user, or (ii) a severity set by the user of the image scanning apparatus is not lower than a predetermined value.

The image processing apparatus may further include: a run state detection section for determining whether a second processing is being carried out, the second processing being a processing other than the image processing corresponding to the image processing request information, wherein: in a case where the second processing is not being carried out, (i) the UI screen preparation section does not cause the display means to the display the execution or non-execution selection screen, and (ii) the image processing section carries out, without waiting for the instruction from the user to carry out the image processing corresponding to the image processing request information, the image processing corresponding to the image processing request information.

The above arrangement allows the image processing corresponding to the image processing request information to immediately start in the case where the image processing apparatus is not carrying out a second processing. The arrangement consequently makes it possible to rapidly carry out the image processing corresponding to the image processing request information.

An image processing system of the present invention is an image processing system in which an image scanning apparatus and any of the above image processing apparatuses are connected to a communication network, the image scanning apparatus scanning a document so as to obtain document image data, the image processing apparatus carrying out, with respect to the document image data, an image processing in response to an instruction from a user of the image scanning apparatus.

Another image processing system of the present invention may be an image processing system in which an image scanning apparatus and an image processing apparatus are connected to a communication network, the image scanning apparatus scanning a document so as to obtain document image data, the image processing apparatus carrying out, with respect to the document image data, an image processing corresponding to image processing request information which is (i) prepared in accordance with an instruction from a user of the image scanning apparatus and (ii) indicative of content of the image processing to be carried out with respect to the document image data, the image processing system including: display means for displaying information to be presented to a user of the image processing apparatus; instruction entry means for accepting an instruction entry from the user of the image processing apparatus; and an image processing section for carrying out an image processing with respect to image data, either the image processing apparatus or a second device connected to the communication network including a UI screen preparation section for, when the image processing apparatus has received image processing request information, preparing an execution or non-execution selection screen to be displayed by the display means, the execution or non-execution selection screen allowing the user of the image processing apparatus to select whether to carry out an image processing corresponding to the image processing request information, when the instruction entry means has accepted from the user of the image processing apparatus an instruction to carry out the image processing corresponding to the image processing request information, the image processing section carrying out, with respect to document image data, the image processing corresponding to the image processing request information.

The above arrangements each allow the user of the image processing apparatus to determine whether to carry out the image processing corresponding to the image processing request information. The arrangements each consequently prevent the user of the image processing apparatus from suffering from a disadvantage arising from an automatic start of the image processing corresponding to the image processing request information.

The image processing system may further include: a server including: storing means for storing in association with each other (i) information indicative of a plurality of the image processing apparatus connected to one another via the communication network and (ii) information indicative of image processings which the image processing apparatuses are individually capable of carrying out; and a UI preparation section for preparing a menu screen that is to be displayed by the display means included in the image scanning apparatus and that includes a list of the image processings, which the image processing apparatuses are individually capable of carrying out and the information indicative of which is stored in the storing means, wherein: either the server or the image scanning apparatus transmits (i) image data of a document scanned by the image scanning apparatus and (ii) image processing request information, indicative of a first image processing which the user of the image scanning apparatus has selected from the list of the image processings and which is to be carried out with respect to the image data of the document, to an image processing apparatus corresponding to the first image processing.

The above arrangement causes a server to manage (i) a plurality of the image processing apparatus connected to one another via the communication network and (ii) image processings which the image processing apparatuses are individually capable of carrying out. The arrangement further causes the server to prepare a menu screen including a list of the image processings available and thus causes the display means in the image scanning apparatus to display the menu screen. This arrangement eliminates the need for the image scanning apparatus to manage information including, in association with each other, information indicative of the image processing apparatuses and information indicative of the image processings which the image processing apparatuses are individually capable of carrying out. The arrangement thus makes it possible to simplify a configuration of the image scanning apparatus. Further, the above arrangement, in a case where, for example, there has been a change to (i) the number of the image processing apparatuses connected to the communication network or (ii) the image processings which the image processing apparatuses are individually capable of carrying out, simply requires information stored in the server to be updated so that content of an image processing can be selected at the image scanning apparatus on the basis of updated information.

An image processing method of the present invention is an image processing method for use in an image processing system in which an image scanning apparatus and an image processing apparatus are connected to a communication network, the image scanning apparatus scanning a document so as to obtain document image data, the image processing apparatus carrying out, with respect to the document image data, an image processing in response to an instruction from a user of the image scanning apparatus, the method, (A) when the image processing apparatus has received (i) document image data and (ii) image processing request information, indicative of content of an image processing to be carried out with respect to the document image data, causing display means included in the image processing apparatus to display an execution or non-execution selection screen for allowing a user of the image processing apparatus to select whether to carry out the image processing corresponding to the image processing request information, and (B) upon acceptance of an instruction from the user of the image processing apparatus to carry out the image processing corresponding to the image processing request information, carrying out, with respect to document image data, the image processing corresponding to the image processing request information.

The above method allows the user of the image processing apparatus to determine whether to carry out the image processing corresponding to the image processing request information. The arrangement consequently prevents the user of the image processing apparatus from suffering from a disadvantage arising from an automatic start of the image processing corresponding to the image processing request information.

The image processing apparatus may be constituted by a computer. In this case, the present invention further encompasses in its scope (i) a program for causing a computer to function as each of the sections so as to constitute the image processing apparatus and (ii) a non-transitory computer-readable storage medium in which the program is stored.

Advantageous Effects of Invention

As described above, an image processing apparatus of the present invention includes a UI screen preparation section for, upon receipt of image processing request information, causing the display means to display an execution or non-execution selection screen for allowing the user of the image processing apparatus to select whether to carry out an image processing corresponding to the image processing request information, when the instruction entry means has accepted from the user of the image processing apparatus an instruction to carry out the image processing corresponding to the image processing request information, the image processing section carrying out, with respect to document image data, the image processing corresponding to the image processing request information.

The above arrangement allows the user of the image processing apparatus to determine whether to carry out the image processing corresponding to the image processing request information. The arrangement consequently prevents the user of the image processing apparatus from suffering from a disadvantage arising from an automatic start of the image processing corresponding to the image processing request information.

BRIEF DESCRIPTION OF DRAWINGS

FIG. 1 is a diagram schematically illustrating an example of an execution/non-execution selection screen displayed by a terminal device included in an image processing system in accordance with an embodiment of the present invention.

FIG. 2 is a diagram schematically illustrating a configuration of the image processing system in accordance with the embodiment of the present invention.

FIG. 3 is a block diagram illustrating respective configurations of a multifunction printer, an OSA server, and a terminal device all included in the image processing system of FIG. 2.

FIG. 4 is a flowchart illustrating a flow of processes carried out in the image processing system of FIG. 2.

FIG. 5 is a diagram schematically illustrating an example of an image processing setting screen displayed by the multifunction printer included in the image processing system of FIG. 2.

DESCRIPTION OF EMBODIMENTS

[Embodiment 1]
(1-1. Configuration of Image Processing System 1)

Figure 2:
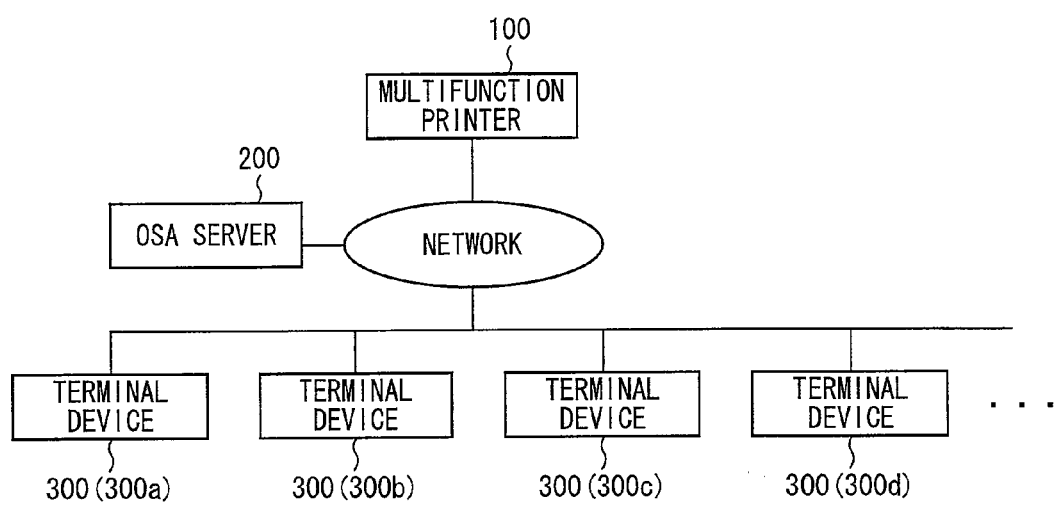
FIG. 2

An embodiment of the present invention is described below. FIG. 2 is a diagram schematically illustrating a configuration of an image processing system 1 of the present embodiment. As illustrated in FIG. 2, the image processing system 1 includes a multifunction printer 100, an OSA server 200, and terminal devices 300 (300a, 300b, 300c, 300d . . . ). The above members are all communicably connected to one another via a communication network.

The present embodiment is described as having a configuration in which the multifunction printer 100, the OSA server 200, and the terminal devices 300 are provided separately from one another and communicate with one another via a communication network. The present invention is, however, not limited to this, and may alternatively have a configuration in which, for example, (i) the multifunction printer 100 is provided integrally with the OSA server 200, or (ii) the OSA server 200 is provided integrally with one of the terminal devices 300.

The communication network is not particularly limited in configuration, and can be the Internet, an intranet, an extranet, a LAN, an ISDN, a VAN, a CATV communication network, a virtual private network, a telephone network, a mobile communication network, or a satellite communication network, for example. In addition, the transmission medium of the communication network is not particularly limited. Therefore, cable communication with use of an IEEE1394, a USB, a power line carrier, a cable TV line, a telephone line or an ADSL, for example, is possible. Further, radio communication with use of an infrared radiation of the IrDA standard or of a remote control, a Bluetooth®, an 802.11 wireless network, an HDR, a mobile phone network, a satellite connection or a digital terrestrial network, for example, is possible. In the present embodiment, the multifunction printer 100, the OSA server 200, and the terminal devices 300 transmit and receive data to and from one another in conformity with FTP (file transfer protocol). The present invention is, however, not limited to this in terms of communication protocol.

Figure 3:
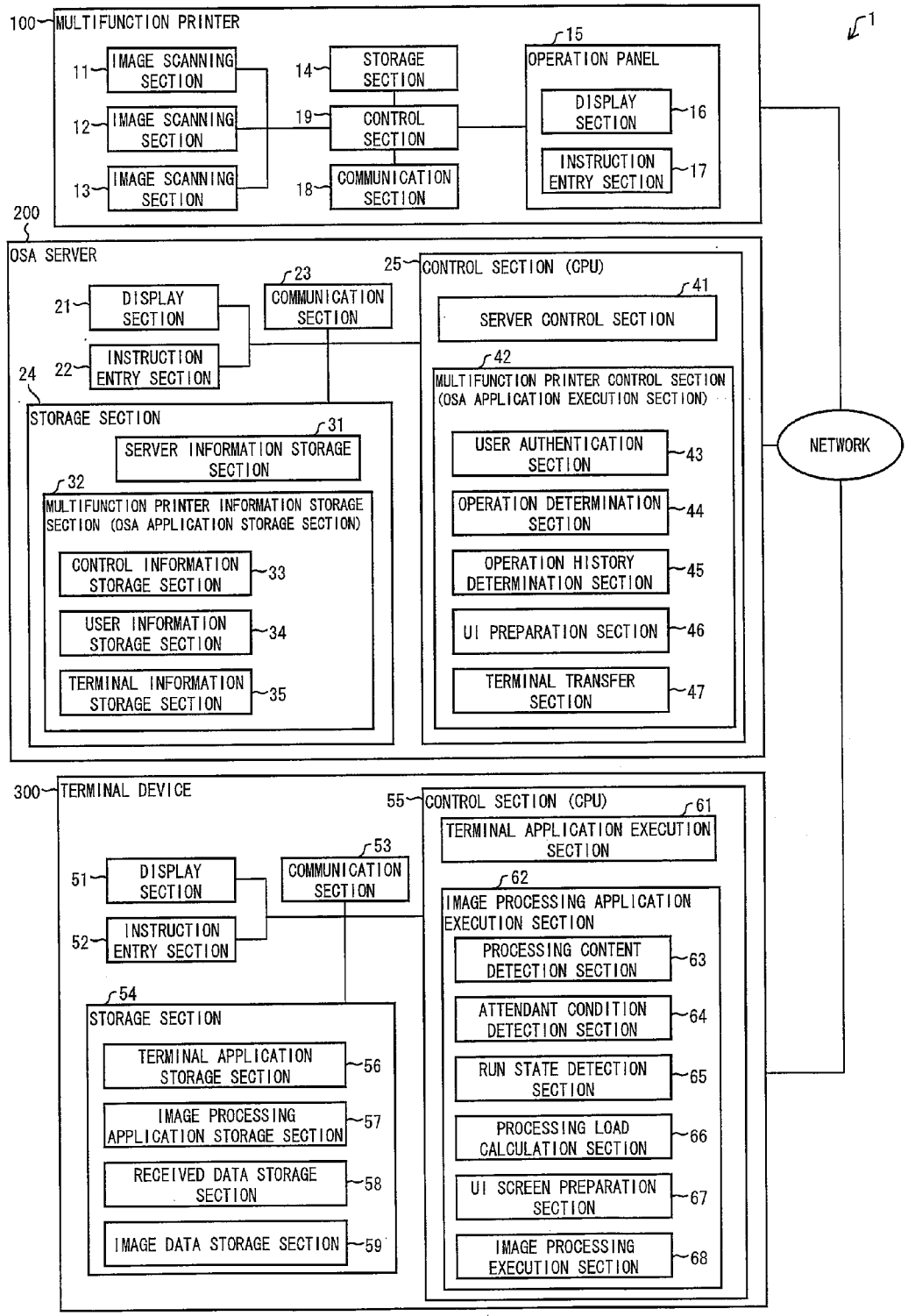
FIG. 3

FIG. 3 is a block diagram illustrating respective configurations of the multifunction printer 100, the OSA server 200, and the terminal devices 300 all included in the image processing system 1.

(1-1-1. Configuration of Multifunction Printer 100)

The multifunction printer (image scanning apparatus; image forming apparatus) 100 includes an image scanning section 11, an image processing section 12, an image forming section 13, a storage section 14, an operation panel 15, a communication section 18, and a control section 19. The image scanning section 11 carries out an image scanning process with respect to a document so as to obtain document image data, that is, image data of the document.

The image scanning section 11 includes, for example, a scanner section (not shown) including a device, such as a CCD (charge coupled device), which converts optical information into an electric signal. The image scanning section 11 is not particularly limited in configuration, and can thus include any of various image scanning devices that have been publicly known.

The image processing section 12 carries out a predetermined image processing with respect to image data.

Specifically, the multifunction printer 100 is capable of carrying out (i) a copying process (image forming process) for forming on a recording material an image indicated by image data obtained by the image scanning section 11, (ii) a print process (image forming process) for forming on a recording material an image indicated by image data received via the communication section 18, and (iii) an image transmission process for transmitting image data obtained by the image scanning section 11 to a second device via the communication section 18.

In a case where the multifunction printer 100 carries out an image forming process (a copying process or a print process) with respect to image data, the image processing section 12 carries out an image processing for processing the image data so that the image data is suitable for the image forming process by the image forming section 13. The image processing includes, according to need, processes such as an A/D conversion process, a shading compensation process, an input tone correction process, a color correction process, a black generation and under color removal process, a spatial filter process, an output tone correction process, and a tone reproduction process. The image data that has been subjected to the image processing by the image processing section 12 is supplied to the image forming section 13. Alternatively, the image data that has been subjected to the image processing by the image processing section 12 may be temporarily stored in the storage section 14 or another memory (not shown) so as to be read out at a predetermined timing and thus supplied to the image forming section 13.

In a case where the multifunction printer 100 carries out an image transmission process, the image processing section 12 carries out, with respect to image data obtained by the image scanning section 11, an image processing so that the image data is suitable for use in a second device. The image processing includes, for example, an A/D conversion process, a shading compensation process, and an input tone correction process. The image data that has been subjected to the image processing by the image processing section 12 is transmitted via the communication section 18 to a destination specified by a user.

The image forming section 13 forms (prints) on a recording material an image indicated by image data supplied from the image processing section 12. The image forming section 13 is not particularly limited in configuration, and can be, for example, an image forming apparatus based on an electrophotographic printing method or an inkjet method.

The operation panel 15 includes: a display section (display means) 16 for displaying information to be presented to a user; and an instruction entry section (instruction entry means) 17 including, for example, various keys for accepting an instruction entry from the user. The operation panel 15 may be a touch panel integrally including the display section 16 and the instruction entry section 17.

The communication section (communication means) 18 communicates with a second device (for example, the OSA server 200 or a terminal device 300) communicably connected thereto via a communication network.

The storage section 14 stores, for example, (i) various commands and setting values entered by a user via the operation panel 15, (ii) results of detection by various sensors provided inside the multifunction printer 100, (iii) various setting values and a data table each for use in controlling operations of respective sections of the multifunction printer 100, and (iv) a program(s) for carrying out various controls. The storage section 14 can be any of various storing means commonly used in the technical field, for example, a read-only memory (ROM), a random access memory (RAM), or a hard disk drive (HDD).

The control section 19 reads out various information items and a program for carrying out various controls, the information items and the program being stored in the storage section 14, and thus carries out processes such as an arithmetic process and a determination process. The control section 19 transmits control signals to respective sections of the multifunction printer 100 on the basis of results of the above processes so as to control operations of the respective sections. The control section 19 is, for example, a processing circuit including a member, such as a microcomputer and a microprocessor, which includes a central processing unit (CPU).

The multifunction printer 100 includes an OSA (open system architecture) mode, in which a user uses, via the operation panel 15, a function of a second device (for example, a terminal device 300) connected to a communication network. In the OSA mode, the OSA server 200 connected to the communication network carries out an OSA application, which controls a menu screen (user interface screen) displayed in the display section 16 of the operation panel 15. The user operates the instruction entry section 17 in reference to the menu screen so as to enter an instruction for a desired operation. This arrangement allows the user to use a function of the second device connected to the communication network.

(1-1-2. Configuration of OSA Server 200)

The OSA server (server) 200 includes: a display section 21; an instruction entry section 22; a communication section 23; a storage section 24; and a control section 25.

The display section (display means) 21 displays information to be presented to a user operating the OSA server 200. The display section 21 is not particularly limited in configuration, and can be, for example, any display means that has been publicly known such as a liquid crystal display and a CRT.

The instruction entry section (instruction entry means) 22 accepts an instruction entry from a user operating the OSA server 200. The instruction entry section 22 is not particularly limited in configuration, and can be, for example, any instruction entry means that has been publicly known such as a keyboard and a mouse.

The communication section (communication means) 23 communicates with a second device (for example, the multifunction printer 100 or a terminal device 300) communicably connected thereto via a communication network.

The storage section 24 includes: a server information storage section 31; and a multifunction printer information storage section (OSA application storage section) 32. The storage section 24 can be any of various storing means commonly used in the technical field, for example, a read-only memory (ROM), a random access memory (RAM), or a hard disk drive (HDD).

The server information storage section 31 stores, for example, (i) various commands and setting values both entered by a user via the instruction entry section 22, and (ii) various setting values, a data table, and a program each for use in controlling operations of respective sections of the OSA server 200.

The multifunction printer information storage section (OSA application storage section) 32 includes: a control information storage section 33; a user information storage section 34; and a terminal information storage section 35.

The control information storage section 33 stores, for example, various setting values, a data table, and a program (OSA application) each for use in controlling operations of respective sections of the multifunction printer 100. The present embodiment involves, as the OSA application, a scan application for controlling (i) an image scanning process by the multifunction printer 100, and (ii) an image transmission process for transmitting to a terminal device 300 image data obtained through the image scanning process, and (iii) an image processing to be carried out by a terminal device 300 with respect to image data received from the outside.

The user information storage section 34 stores (i) authentication information for a user operating the multifunction printer 100 and (ii) various information items set by the user. The authentication information includes, for example, (i) a user ID, (ii) a password, (iii) biometrics information, and (iv) a combination of any of the above. The various information items include, for example, (i) information indicative of a menu screen (UI screen) customized by the user, (ii) setting information indicative of various parameters for the image scanning process, the image transmission process, and the image processing, (iii) operation history information indicative of the user's past use, and (iv) a priority or severity for an image processing to be carried out with respect to data of a scanned image.

The terminal information storage section 35 stores, for example, (i) information indicative of terminal devices which the multifunction printer 100 can use in the OSA mode, (ii) information indicative of image processing applications which each terminal device includes and which the multifunction printer 100 can use in the OSA mode (that is, information indicative of image processings which can be carried out by each terminal device), (iii) address information for each terminal device, and (iv) information indicative of a processing performance of each terminal device (for example, a throughput of a CPU, a storage capacity of a RAM, and a transmission rate).

The control section 25 reads out from the storage section 24 various information items and a program for carrying out various controls, and thus carries out a process based on the program. The control section 25 may be, for example, a processing circuit including a member, such as a microcomputer and a microprocessor, which includes a central processing unit (CPU).

The control section 25 includes: a server control section 41; and a multifunction printer control section (OSA application execution section) 42. The multifunction printer control section 42 in turn includes: a user authentication section 43; an operation determination section 44; an operation history determination section 45; a UI preparation section 46; and a terminal transfer section 47.

The server control section 41 reads out various information items and a program stored in the server information storage section 31, and executes the program so as to control operations of respective sections of the OSA server 200.

The multifunction printer control section 42, when the multifunction printer 100 is in the OSA mode, reads out various information items and a program stored in the multifunction printer information storage section 32, and executes the program so as to control operations of respective sections of the OSA server 200.

Specifically, in a case where the multifunction printer 100 has selected the OSA mode, the UI preparation section 46 (i) prepares, on the basis of various information items stored in the multifunction printer information storage section 32, a UI screen (user interface screen) to be displayed in the display section 16 of the multifunction printer 100, and (ii) transmits information indicative of the UI screen to the multifunction printer 100 via the communication section 23 so that the UI screen is displayed in the display section 16.

The operation determination section 44 determines content of an instruction from a user on the basis of an image processing request received from the multifunction printer 100. Specifically, the operation determination section 44 determines, for example, (i) information indicative of a destination terminal device which is to carry out an image processing, (ii) content of the image processing, (iii) various parameters for use in the image processing, and (iv) where to store (or transmit) image data to be obtained through the image processing.

The user authentication section 43 carries out a user authentication process for matching (i) user information entered by a user via the instruction entry section 17 of the multifunction printer 100 with (ii) authentication information stored in the user information storage section 34.

The operation history determination section 45, in a case where a user authentication process by the user authentication section 43 has been completed successfully, (i) reads out from the user information storage section 34 a history of operations carried out with respect to the multifunction printer 100 by the user for whom the user authentication process has been completed successfully, and (ii) transmits the operation history to the UI preparation section 46. This arrangement allows the UI preparation section 46 to prepare a UI screen in accordance with the user's operation history.

The terminal transfer section 47, in a case where it has received image data and an image processing request from the multifunction printer 100, controls the communication section 23 on the basis of destination information for a terminal device 300 which is to carry out an image processing determined by the operation determination section 44. The terminal transfer section 47 thus transmits (i) the image data received from the multifunction printer 100, (ii) information attendant to the image data, and (iii) information indicative of content of an image processing to be carried out with respect to the image data. The information attendant to the image data includes, for example, user information, information indicative of a severity or priority set by the user of the multifunction printer 100 for an image processing to be carried out with respect to the document image data, information indicative of a color type (monochrome or color), information indicative of a type of a document sheet, information indicative of whether the document has an image on each side thereof, size information indicative of a size of the document, document count information indicative of a number of sheets (pages) included in the document, resolution information indicative of resolution (number of pixels) of the document, format information indicative of a format of the document, and time information indicative of a time at which the document was scanned. The information indicative of content of an image processing to be carried out with respect to the image data includes, for example, information indicative of a type of the image processing and various parameters set for the image processing. The information attendant to the image data may be transmitted as embedded in the image data, or may be transmitted separately from the image data.

(1-1-3. Configuration of Terminal Device 300)

A terminal device (image processing apparatus) 300 includes: a display section 51; an instruction entry section 52; a communication section 53; a storage section 54; and a control section 55.

The display section (display means) 51 displays information to be presented to a user of the terminal device 300. The display section 51 is not particularly limited in configuration, and can be, for example, any display means that has been publicly known such as a liquid crystal display and a CRT.

The instruction entry section (instruction entry means) 52 accepts an instruction entry from a user of the terminal device 300. The instruction entry section 52 is not particularly limited in configuration, and can be, for example, any instruction entry means that has been publicly known such as a keyboard and a mouse.

The communication section (communication means) 53 communicates with a second device (for example, the multifunction printer 100 or the OSA server 200) communicably connected thereto via a communication network.

The storage section 54 includes: a terminal application storage section 56; an image processing application storage section 57; a received data storage section 58; and an image data storage section 59. The storage section 54 can be any of various storing means commonly used in the technical field, for example, a read-only memory (ROM), a random access memory (RAM), or a hard disk drive (HDD).

The terminal application storage section 56 stores various applications which a user of the terminal device 300 can use with use of the display section 51 and the instruction entry section 52. The various applications refer to terminal applications such as word processing software, spreadsheet software, drawing software, image editing software, Internet browser software, electronic mail software, and game software.

The image processing application storage section 57 stores an image processing application (image processing application program) for carrying out an image processing with respect to image data. The image processing is not particularly limited, and includes, for example, a distortion correction process, a rotation process, an enlarging/reducing process, a noise reduction process, a color conversion process, an OCR process, a compression process, a voucher splitting process, a translation process, a furigana (kana readings of Chinese characters) printing process, a file format conversion process, a file name automatic preparation process, a resolution conversion process, an image size conversion process, a sharpness process, and a blurring process.

The present embodiment allows a user to use, with use of the multifunction printer 100 in the OSA mode, a function of an image processing application stored in the image processing application storage section 57. Specifically, the terminal information storage section 35 of the OSA server 200 stores information about an image processing application stored in the image processing application storage section 57, while the UI preparation section 46 of the OSA server 200 (i) prepares an input screen (UI screen) on which the user enters an instruction to carry out an image processing on the image processing application, and (ii) causes the display section 16 of the multifunction printer 100 to display the input screen. This arrangement allows a user of the multifunction printer 100 to enter an instruction on the input screen via the instruction entry section 17 so as to transmit image data to the terminal device 300 and thus cause the terminal device 300 to carry out a desired image processing.

The received data storage section 58 temporarily stores data received from the OSA server 200 via the communication section 53. The data includes (i) document image data, (ii) information attendant to the document image data, and (iii) information indicative of content of an image processing request (that is, image processing request information).

The image data storage section 59 stores image data obtained as a result of an image processing application carrying out an image processing with respect to document image data.

The control section 55 reads out from the storage section 54 various information items and a program for carrying out various controls, and thus carries out a process based on the program. The control section 55 may be, for example, a processing circuit including a member, such as a microcomputer and a microprocessor, which includes a central processing unit (CPU).

The control section 55 includes: a terminal application execution section 61; and an image processing application execution section 62.

The terminal application execution section 61 executes, in response to an instruction entered by a user of the terminal device 300 via the instruction entry section 52, a terminal application stored in the terminal application storage section 56. The terminal application execution section 61 may be arranged to also execute, in response to an instruction entered by a user of the terminal device 300, an image processing application stored in the image processing application storage section 57.

The image processing application execution section 62 includes: a processing content detection section 63; an attendant condition detection section 64; a run state detection section 65; a processing load calculation section 66; a UI screen preparation section 67; and an image processing execution section 68.

The processing content detection section 63 (i) detects, from information received from the OSA server 200, image processing request information indicative of content of an image processing to be carrying out with respect to image data, and (ii) analyzes content of the image processing request information.

The attendant condition detection section 64 (i) detects, from information received from the OSA server 200, information attendant to image data, and (ii) analyzes content of the attendant information.

The run state detection section 65 detects a run state of the terminal device 300. The run state refers to, for example, a utilization rate of the CPU (the control section 55) and a utilization rate of a working memory (not shown).

The processing load calculation section 66 calculates, on the basis of (i) content of an image processing request, the content having been detected by the processing content detection section 63, (ii) a condition attendant to image data, the condition having been detected by the attendant condition detection section 64, and (iii) a run state of the control section 55, the run state having been detected by the run state detection section 65, a processing load estimated for a case in which an image processing in response to the image processing request is to be carried out with respect to the image data received from the OSA server 200.

The processing load calculation section 66 of the present embodiment calculates, as the estimated processing load, (i) an estimated CPU utilization rate (estimated share in the CPU), (ii) an estimated processing time, (iii) an estimated delay time, and (iv) an estimated load level.

The estimated CPU utilization rate refers to a CPU utilization rate for a case in which an image processing is to be carried out in response to an image processing request. In a case where a user of the terminal device 300 is using the terminal device 300 (for example, executing an application stored in the terminal application storage section 56 or the image processing application storage section 57), the processing load calculation section 66 may calculate a CPU utilization rate for an image processing to be carried out in response to an image processing request for a case in which the above processing in execution (second processing) is carried out in parallel to the image processing corresponding to the image processing request received from the OSA server 200. The estimated CPU utilization rate may alternatively be, for example, an estimated mean value of a CPU utilization rate obtained while an image processing in response to an image processing request is being carried out.

The estimated processing time refers to a time period estimated for an image processing to be carried out in response to an image processing request. In a case where a user of the terminal device 300 is using the terminal device 300 (for example, executing an application stored in the terminal application storage section 56 or the image processing application storage section 57), the processing load calculation section 66 may calculate an estimated processing time for an image processing to be carried out in response to an image processing request for a case in which the above processing in execution (second processing) is carried out in parallel to the image processing corresponding to the image processing request received from the OSA server 200.

The estimated delay time refers to a delay time estimated for a processing which is being carried out as instructed by a user of the terminal device 300 who is using the terminal device 300 (for example, executing an application stored in the terminal application storage section 56 or the image processing application storage section 57), the above processing in execution (second processing) being carried out in parallel to an image processing corresponding to an image processing request received from the OSA server 200. In other words, the estimated delay time refers to a time period obtained by subtracting (i) a processing time estimated for the processing in execution for a case in which the processing is carried out while an image processing is not carried out in response to an image processing request, from (ii) a processing time estimated for the processing in execution for a case in which the processing is carried out while an image processing is carried out in response to an image processing request.

The estimated load level refers to a level determined from among a plurality of predetermined levels by comparison of an estimated CPU utilization rate with a predetermined threshold. The plurality of predetermined levels are, for example, three levels (large, middle, and small) or five levels (Level 1 through Level 5). The processing load calculation section 66 may alternatively calculate an estimated load level by determining a level from among a plurality of predetermined levels by comparison of an estimated processing time or an estimated delay time with a predetermined threshold.

The calculation of the estimated processing time and the estimated CPU utilization rate is not particularly limited in terms of method, and can thus be carried out by a method which has been publicly known.

The calculation can be carried out by, for example, a method similar to a method disclosed in Patent Literature 2. Specifically, the calculation can be carried out as follows: Each time the terminal device 300 carries out an image processing, the storage section 24 records log information including (i) content of the image processing and (ii) a time period required for the image processing. The terminal device 300, upon receipt of an image processing request, detects from the log information a processing time period required for an image processing which corresponds to or is similar to an image processing corresponding to the image processing request. The processing load calculation section 66 calculates, on the basis of a result of the detection, an estimation of a processing time required for the image processing corresponding to the image processing request.

The calculation can alternatively be carried out by, for example, a method similar to a method disclosed in Patent Literature 3. Specifically, the calculation can be carried out as follows: The terminal device 300 in advance prepares and stores table information including (i) information indicative of content of an image processing, (ii) information indicative of setting values of various parameters under individual image processing conditions, and (iii) information for setting the parameters. The processing load calculation section 66 calculates an estimated processing time on the basis of such table information.

The estimated processing time may further be calculated from a mathematical equation based on (i) the number of pixels for image data and (ii) constants each defined in correspondence with content of an image processing. The calculation may be carried out by, for example, a method similar to a method disclosed in Patent Literature 4. Specifically, the estimated processing time may be calculated by finding a value of the equation $T=A \times x+B$, where x represents the number of pixels for output image data, T represents an estimated processing time, and A and B each represent a constant defined in correspondence with content of an image processing.

A method similar to the above can be used to calculate an estimated processing time for a processing to be carried out by the terminal device 300 which processing is other than an image processing corresponding to an image processing request.

The estimated CPU utilization rate may be calculated, similarly to the estimated processing time, (i) on the basis of CPU utilization rate log information which has been stored each time the terminal device 300 carries out an image processing, (ii) on the basis of table information prepared in advance, or (iii) from a mathematical equation defined in correspondence with content of an image processing.

The processing load calculation section 66 may alternatively calculate an estimated CPU utilization rate for the terminal device 300 and calculate, on the basis of (i) the estimated CPU utilization rate calculated as above and (ii) a processing performance of the terminal device 300 which processing performance has been obtained in advance, an estimated operation time for an image processing to be carried out in response to an image processing request.

The UI screen preparation section 67, in a case where it has received image data and an image processing request from the OSA server 200, (i) prepares an execution/non-execution selection screen (UI screen) for prompting a user of the terminal device 300 to select whether to immediately carry out an image processing corresponding to the image processing request and (ii) causes the display section 51 to display the execution/non-execution selection screen.

The image processing execution section 68, in a case where a user of the terminal device 300 has selected to carry out an image processing corresponding to an image processing request received from the OSA server 200, carries out the image processing and causes the image data storage section 59 to store image data obtained as a result of the image processing. The image processing execution section 68, in a case where the image processing request received from the OSA server 200 requests the terminal device 300 to transmit, to a second device, image data obtained as a result of the image processing, may transmit such image data via the communication section 53 to a destination specified in the image processing request. The image processing execution section 68, in a case where the image processing request received from the OSA server 200 specifies where to store image data obtained as a result of the image processing, may store such image data at a location specified.

(1-2. Operation of Image Processing System 1)

Figure 4:
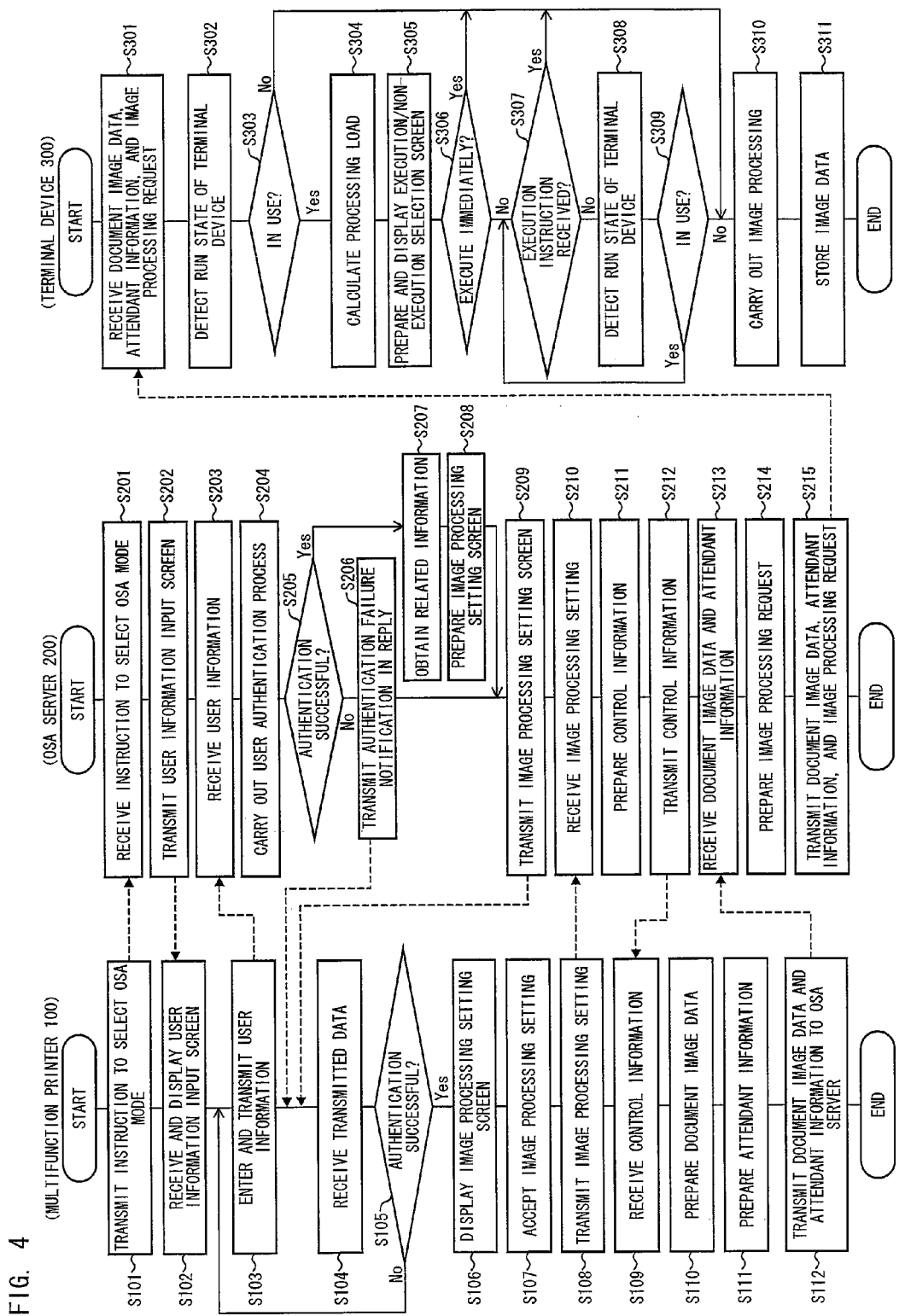
FIG. 4

FIG. 4 is a flowchart illustrating a flow of processes carried out in the image processing system 1.

First, when a user of the multifunction printer 100 has entered an instruction via the instruction entry section 17 to select the OSA mode (in the present embodiment, the image scanning process mode (scan mode)), the control section 19 transmits, to the OSA server 200 via the communication section 18, a notification indicative of the instruction to select the OSA mode (S101).

The multifunction printer control section 42 (UI preparation section 46) of the OSA server 200, when the communication section 23 has received from the multifunction printer 100 the notification indicative of the instruction to select the OSA mode (S201), (i) prepares a user information input screen (UI screen) for prompting the user of the multifunction printer 100 to enter user information, and (ii) transmits the user information input screen to the multifunction printer 100 via the communication section 23 (S202).

The control section 19 of the multifunction printer 100, when the communication section 18 has received the user information input screen from the OSA server 200, causes the display section 16 to display the user information input screen (S102). The control section 19 then accepts user information entered by the user via the instruction entry section 17, and transmits the user information thus accepted to the OSA server 200 via the communication section 18 (S103).

The multifunction printer control section 42 (the user authentication section 43) of the OSA server 200, when the communication section 23 has received the user information from the multifunction printer 100 (S203), carries out a user authentication process for matching the received user information with authentication information stored in the user information storage section 34 (S204).

The multifunction printer control section 42 (the user authentication section 43) determines whether it has completed the user authentication successfully (S205). In a case where the multifunction printer control section 42 has completed the user authentication unsuccessfully, the multifunction printer control section 42 transmits an authentication failure notification to the multifunction printer 100 via the communication section 23 in reply (S206).

In a case where the multifunction printer control section 42 has completed the user authentication successfully, the multifunction printer control section 42 (the UI preparation section 46) reads out user related information stored in the user information storage section 34 (S207), and prepares, on the basis of the user related information thus read out, an image processing setting screen for allowing the user of the multifunction printer 100 to set content of an image processing (S208).

Specifically, the multifunction printer control section 42 (the UI preparation section 46) extracts image processing applications available for the user for whom a user authentication has been completed successfully. The user information storage section 34 may, for example, store in advance a list of image processing applications available for the user so that the list can be extracted. Alternatively, the user information storage section 34 may store a list of terminal devices available for the user, whereas the terminal information storage section 35 may store a list of image processing applications executable for each of the terminal devices (that is, image processing applications installed in each of the terminal devices), so that the user can extract an image processing application available with reference to the two lists. Further alternatively, the multifunction printer control section 42 may detect a terminal device with which it can currently communicate via a communication network, and thus extract image processing applications available for the user on the basis of a result of the detection and the two lists.

The multifunction printer control section 42 (the operation history determination section 45) reads out from the user information storage section 34 information (for example, image processing parameters previously selected) indicative of a history of past operations carried out by the user for whom the user authentication has been completed successfully. The multifunction printer control section 42 (the UI preparation section 46) then prepares an image processing setting screen which reflects (i) the image processing applications available for the user for whom the user authentication has been completed successfully and (ii) the information indicative of the history of past operations carried out by the user. The multifunction printer control section 42 (the UI preparation section 46), for example, causes the image processing applications available for the user to be displayed in order of frequency of the user's past use or in order of recency in use.

The multifunction printer control section 42 (the UI preparation section 46) next transmits the image processing setting screen thus prepared to the multifunction printer 100 via the communication section 23 in reply (S209). The multifunction printer control section 42 (the user authentication section 43) may transmit, in addition to the image processing setting screen, an authentication success notification to the multifunction printer 100 in reply.

The control section 19 of the multifunction printer 100, upon receipt of the reply data transmitted from the OSA server 200 (S104), determines on the basis of the reply data whether the user authentication has been completed successfully (S105). Specifically, in a case where the reply data is an authentication failure notification, the control section 19 determines that the user authentication has been completed unsuccessfully, whereas in a case where the reply data includes an image processing setting screen or an authentication success notification, the control section 19 determines that the user authentication has been completed successfully.

The control section 19 of the multifunction printer 100, in the case where it has determined that the user authentication has been completed unsuccessfully, returns to S103 and accepts reentry of user information.

The control section 19 of the multifunction printer 100, in the case where it has determined that the user authentication has been completed successfully, causes the display section 16 to display the image processing setting screen received from the OSA server 200 (S106), and then accepts image processing settings (for example, selected content of an image processing and parameter settings of an image scanning process and the image processing) entered by the user via the instruction entry section 17 (S107). The control section 19 of the multifunction printer 100 further transmits, to the OSA server 200 via the communication section 23, image processing setting information indicative of content of the image processing settings accepted (S108).

Figure 5:
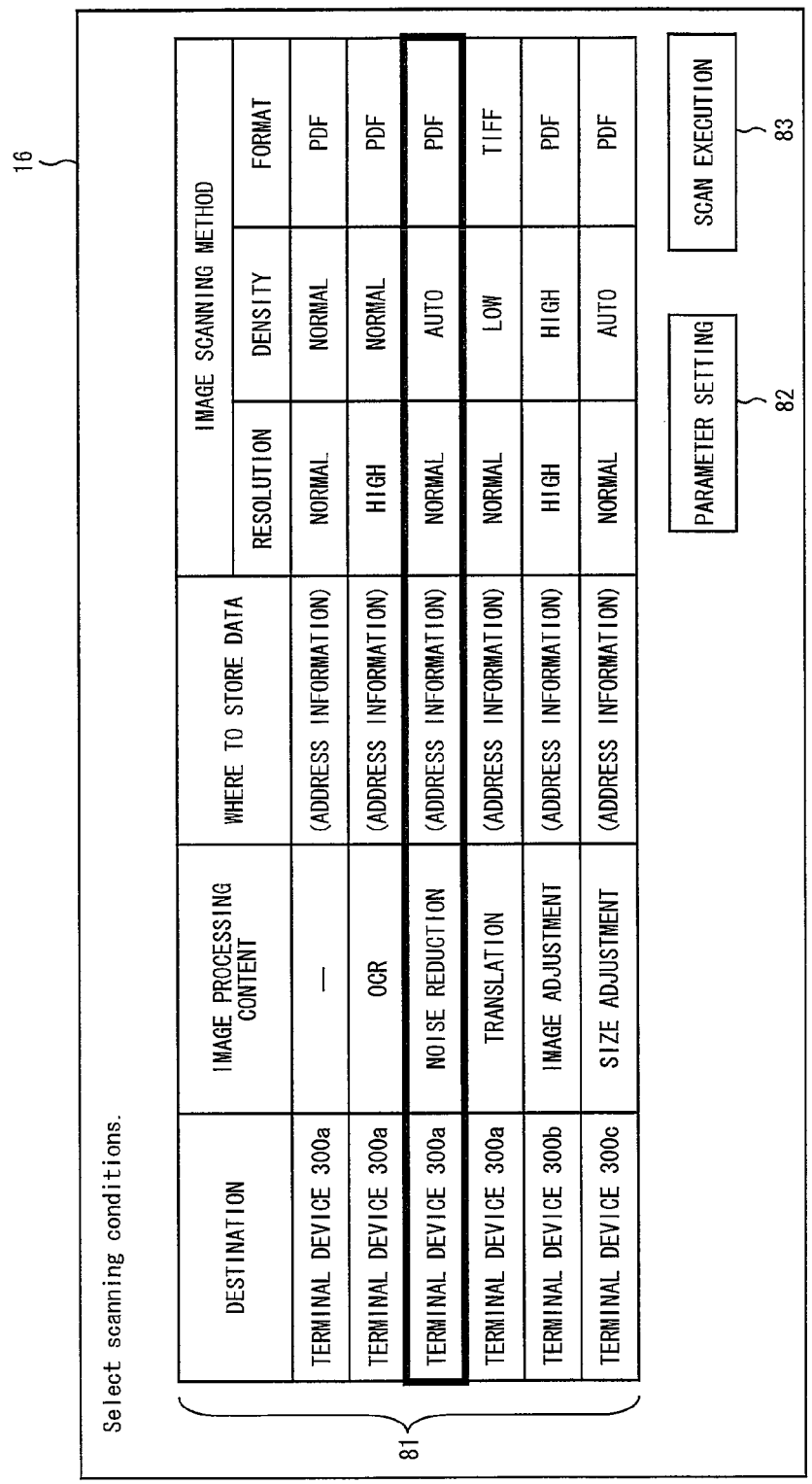
FIG. 5

FIG. 5 is a diagram schematically illustrating an example of the image processing setting screen prepared by the UI preparation section 46 and displayed in the display section 16 of the multifunction printer 100. The example of FIG. 5 shows a list 81 containing the following items: (i) terminal devices available ("DESTINATION" column in FIG. 5), (ii) image processing applications available ("IMAGE PROCESSING CONTENT" column in FIG. 5), (iii) address information for where to store image data obtained as a result of the image processing ("WHERE TO STORE DATA" column in FIG. 5), and (iv) setting parameters for the image scanning process ("IMAGE SCANNING METHOD" column in FIG. 5). The example further shows, below the list 81, (i) a parameter setting button 82 which a user presses for a detailed setup, that is, to change setting of various parameters, for the image scanning process and the image processing and (ii) a scan execution button 83 which a user presses for an instruction to start the image scanning process.

The above arrangement allows the user to operate the instruction entry section 17 so as to select from the list 81a desired combination of a terminal device, image processing content, and an image scanning method.

Pressing the parameter setting button 82 while a desired combination is selected causes content of the pressing operation to be transmitted to the OSA server 200. The UI preparation section 46 of the OSA server 200 in response (i) prepares a parameter setting screen (UI screen; not shown) for changing setting of various parameters (detailed setup) in the combination for the image scanning process and the image processing, and (ii) causes the display section 16 of the multifunction printer 100 to display the parameter setting screen. The user can set detailed conditions such as resolution for an image scanning process, scanning density, a format of document image data to be prepared, a color type (whether to prepare monochrome image data or color image data), whether to carry out two-side scanning or one-side scanning, a document size, the number of sheets included in the document, and a type of a document sheet. The document size and the number of sheets in the document may alternatively be detected automatically when the image scanning section 11 carries out scanning. The above detection can be carried out by any of methods which have been publicly known.

Pressing the parameter setting button 82 while a desired combination is selected or after parameter setting has been completed causes image processing setting information indicative of the selected image scanning conditions and image processing conditions to be transmitted to the OSA server 200.

When the communication section 23 has received the image processing setting information from the multifunction printer 100 (S210), the multifunction printer control section 42 (the operation determination section 44) of the OSA server 200 (i) prepares, on the basis of content of the image processing setting information, control information for controlling operation of the multifunction printer 100 (S211) and (ii) transmits the control information thus prepared to the multifunction printer 100 via the communication section 23 (S212).

The control section 19 of the multifunction printer 100 carries out a scanning process with respect to the document on the basis of the control information received from the OSA server 200, and thus prepares (S110). The control section 19 of the multifunction printer 100 further prepares information attendant to the document image data (S111). The attendant information can include information indicative of, for example, the user of the multifunction printer 100 (that is, the user for whom a user authentication process has been completed successfully), a severity or priority set by the user of the multifunction printer 100 for an image processing to be carried out with respect to the document image data, a document size, the number of sheets (pages) included in the document, resolution of the document image data, a color type of the document, whether the document has an image on each side thereof or only one side thereof, and a format of the document image data.

The control section 19 of the multifunction printer 100 transmits the document image data and the information attendant thereto to the OSA server 200 via the communication section 18 (S112) to end its process.

In the present embodiment, the steps S102 through S112 are carried out by the control section 19 of the multifunction printer 100. The present invention is, however, not limited to such an arrangement. Alternatively, the control section 25 (the multifunction printer control section 42) of the OSA server 200 may directly control respective sections of the multifunction printer 100 so as to carry out the steps S102 through S112.

The multifunction printer control section 42 (the operation determination section 44) of the OSA server 200, when the communication section 23 has received from the communication section 23 the document image data and the information attendant thereto (S213), prepares an image processing request (image processing request information) for causing a terminal device 300 to carry out an image processing (an image processing corresponding to the image processing setting information) according to an instruction by the user of the multifunction printer 100 (S214). The multifunction printer control section 42 (the terminal transfer section 47) of the OSA server 200 then transmits the document image data, the attendant information, and the image processing request via the communication section 23 to a terminal device 300 which is to carry out the image processing with respect to the document image data (S215) to end its process.

The image processing application execution section 62 (the run state detection section 65) of the terminal device 300, when the communication section 53 has received the document image data, the attendant information, and the image processing request from the OSA server 200 (S301), detects a run state of the terminal device 300 (S302) and thus determines whether a user of the terminal device 300 is using the terminal device 300, that is, whether the user is carrying out a process (for example, a terminal application or image processing application) other than the image processing corresponding to the image processing request (S303). The data received from the OSA server 200 (namely, the document image data, the attendant information, and the image processing request) are temporarily stored in the received data storage section 58 and read out as appropriate.

In a case where the image processing application execution section 62 has determined that a user of the terminal device 300 is using the terminal device 300, the image processing application execution section 62 (the processing load calculation section 66) calculates an estimated processing load (specifically, an estimated CPU utilization rate, an estimated processing time, an estimated delay time, and an estimated load level) for a case where the image processing corresponding to the image processing request is carried out with respect to the document image data received from the OSA server 200 (S304).

The image processing application execution section 62 (the UI screen preparation section 67) then (i) prepares an execution/non-execution selection screen for prompting the user of the terminal device 300 to select whether to immediately carry out the image processing corresponding to the image processing request received from the OSA server 200, and (ii) causes the display section 51 to display the execution/non-execution selection screen (S305).

Figure 1:
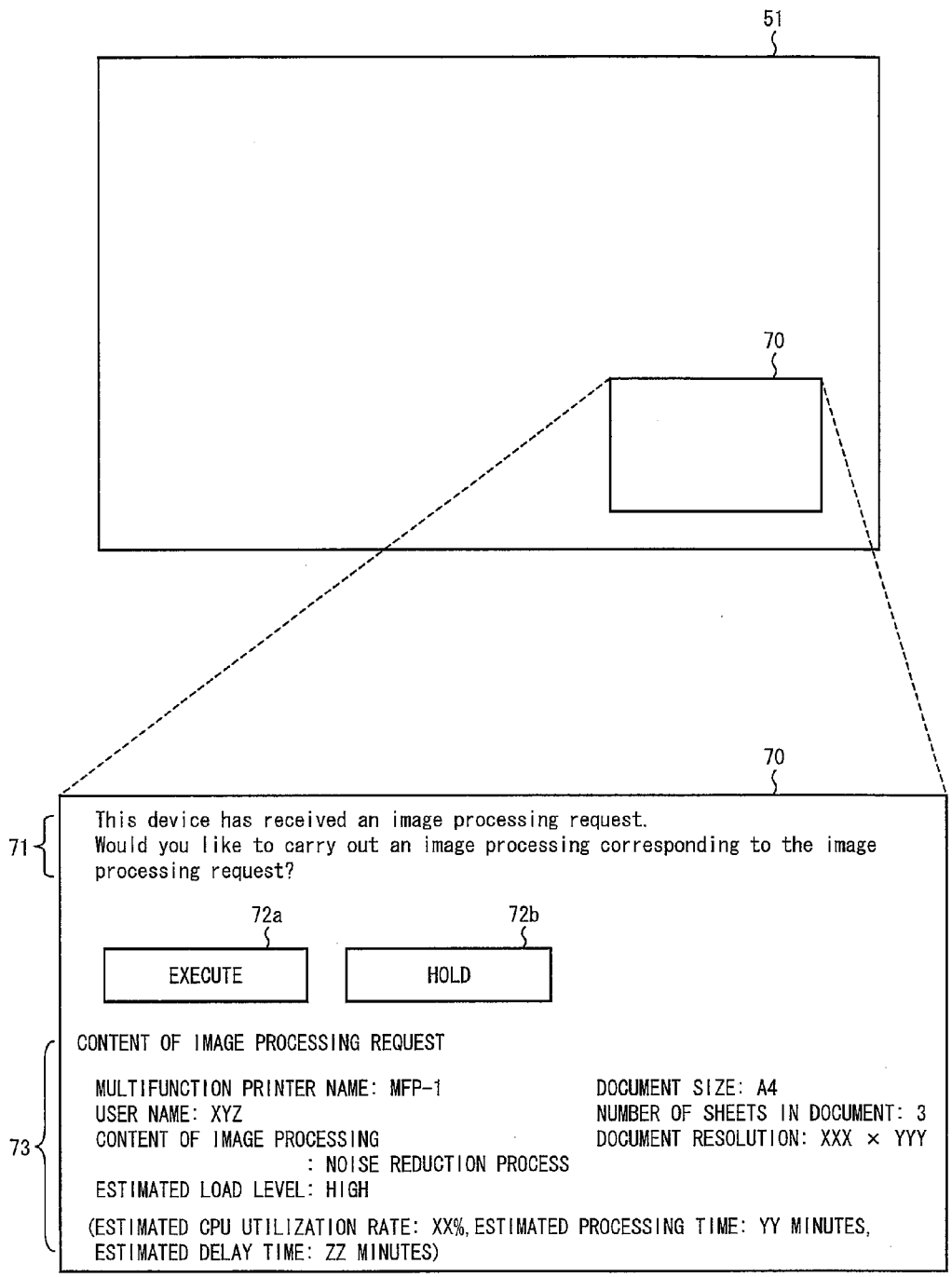
FIG. 1

FIG. 1 is a diagram schematically illustrating an example of the execution/non-execution selection screen 70 displayed in the display section 51 of the terminal device 300. As illustrated in FIG. 1, the present embodiment causes a part of a display screen in the display section 51 to display a dialog box (display window) including the execution/non-execution selection screen 70. The present embodiment further shows on the execution/non-execution selection screen 70 (i) a message 71 indicative of receipt of an image processing request from the OSA server 200, (ii) a button 72*a* for selecting carrying out of an image processing, (iii) a button 72*b* for selecting holding of an image processing, and (iv) a message 73 indicative of content of the image processing request and content of the information attendant to the document image data.

Specifically, the example illustrated in FIG. 1 displays, as the message 73, a multifunction printer name, a user name, image processing content (image processing type), a document size, the number of sheets included in the document, document resolution, an estimated load level, an estimated CPU utilization rate, an estimated processing time, and an estimated delay time.

The information included in the execution/non-execution selection screen 70 is not limited to the above. The execution/non-execution selection screen 70 may display, in addition to the buttons 72*a* and 72*b*, a button for, e.g., selecting cancellation (refusal) of an image processing. Alternatively, the information included in the message 73 illustrated in FIG. 1 may be omitted entirely or partially. Further alternatively, other information may be displayed (i) in addition to the information included in the message 73 illustrated in FIG. 1 or (ii) instead of all or part of the information included in the message 73 illustrated in FIG. 1. The above other information includes, for example, (i) other information included in the information attendant to the document image data and (ii) a thumbnail image or reduced image of the document image data.

The message 73 displayed in the execution/non-execution selection screen 70 may also be replaced with, for example, a button for displaying the information included in the message 73, so that the message 73 will be displayed in response to an operation of pressing the button.

The image processing application execution section 62 (the image processing execution section 68) next determines, on the basis of a selection entry made by the user on the execution/non-execution selection screen via the instruction entry section 52, whether to carry out the image processing or hold such carrying out of the image processing (S306).

The image processing application execution section 62 (the image processing execution section 68), in a case where it has selected holding of carrying out of the image processing, monitors whether the user of the terminal device 300 gives an instruction to carry out the image processing corresponding to the image processing request received from the OSA server 200 (S307). In the case where the image processing application execution section 62 has selected holding of carrying out of an image processing, the image processing application execution section 62 (the UI screen preparation section 67) may alternatively (i) end the display of the execution/non-execution selection screen 70 and (ii) cause a part of the display section 51 to display, for example, an icon for displaying the execution/non-execution selection screen 70 again.

In a case where the image processing application execution section 62 has determined in S307 that the user of the terminal device 300 has not given an instruction to carry out the image processing, the image processing application execution section 62 (the run state detection section 65) determines whether a user is using the terminal device 300 (S308). In a case where the image processing application execution section 62 has determined that a user is using the terminal device 300, the process returns to the step S307.

In a case where the image processing application execution section 62 has determined in either of the steps S303 and S308 that a user is not using the terminal device 300, the image processing application execution section 62 (the image processing execution section 68) (i) executes an image processing application stored in the image processing application storage section 57 and (ii) carries out the image processing with respect to the document image data in response to the image processing request received from the OSA server 200 (S310). The image processing application execution section 62 then stores in the image data storage section 59 image data obtained as a result of the image processing, and ends the process.

In a case where an image processing has been completed, the image processing application execution section 62 (the image processing execution section 68) may transmit a completion notification to the OSA server 200, and the multifunction printer control section 42 (the UI preparation section 46) of the OSA server 200 may then (i) prepare a display screen indicative of the completion of the image processing and (ii) cause the display section 16 of the multifunction printer 100 to display the display screen. Further, in the case where a user of the terminal device 300 can select, on the execution/non-execution selection screen, refusal (cancellation) of carrying out of an image processing corresponding to an image processing request, the image processing application execution section 62 (the image processing execution section 68) may, if the carrying out of an image processing has been refused, notify the OSA server 200 of the refusal, and the multifunction printer control section 42 (the UI preparation section 46) of the OSA server 200 may then (i) prepare a display screen indicative of the refusal of the image processing and (ii) cause the display section 16 of the multifunction printer 100 to display the display screen.

(1-3. Advantage of Image Processing System 1)

As described above, the image processing system 1 of the present embodiment, when a terminal device 300 has received (i) image data of a document scanned by the multifunction printer 100 and (ii) a request of an image processing for the document image data, causes the display section 51 of the terminal device 300 to display an execution/non-execution selection screen for prompting a user of the terminal device 300 to select whether to carry out an image processing corresponding to the image processing request, thus allowing the user of the terminal device 300 to make the selection.

The above arrangement, in a case where a user of the terminal device 300 is using the terminal device 300, prevents the user of the terminal device 300 from suffering from a disadvantage arising from an automatic start of an image processing corresponding to an image processing request received from the OSA server 200.

The image processing system 1 may be arranged such that (i) the storage section 54 stores a preset priority condition for preferentially carrying out, in a case where the terminal device 300 has received an image processing request from the OSA server 200, an image processing in response to the image processing request even if the terminal device 300 is being used for another processing, and that (ii) if content of attendant information or that of the image processing request meets the priority condition, the terminal device 300 carries out the image processing without causing the display section 51 to display the execution/non-execution selection screen.

The above priority condition is, for example, (i) whether a user who has made an image processing request at the multifunction printer 100 is a particular user specified in advance, (ii) whether the multifunction printer 100 is a particular multifunction printer specified in advance, (iii) whether content of the image processing is that of a particular image processing specified in advance, (iv) whether the estimated CPU utilization rate is not greater than a predetermined value, (v) whether the estimated processing time is not longer than a predetermined time, (vi) whether the estimated delay time is not longer than a predetermined time, or (vii) whether a priority set by the user of the multifunction printer 100 for the image processing is not lower than a threshold.

In a specific example, a terminal device 300 may carry out an image processing in response to an image processing request without displaying the execution/non-execution selection screen 70 in a case where a user who has made an image processing request at the multifunction printer 100 is higher in official position than a user of the terminal device 300.

A terminal device 300 may also carry out an image processing in response to an image processing request without displaying the execution/non-execution selection screen 70 in a case where (i) the estimated processing load (the estimated CPU utilization rate) is not greater than a predetermined value, (ii) the estimated processing time or the estimated delay time is not longer than a predetermined time, or (iii) the estimated load level is not greater than a predetermined value.

The priority condition may be (i) set randomly by a user of a terminal device 300 and thus stored in the storage section 54 of the terminal device 300, or (ii) stored in the storage section 24 of the OSA server 200 or in the storage section 14 of the multifunction printer 100 so as to be transmitted to a terminal device 300 as a condition attendant to document image data when an image processing request has been made. Further, the priority condition may be set (i) for each individual image processing application, (ii) commonly for all image processing applications, or (iii) for each individual terminal device 300.

The present embodiment causes a terminal device 300 to calculate an estimated processing load. The present invention is, however, not limited to such an arrangement. The image processing system 1 may be arranged, for example, such that (i) the terminal information storage section 35 of the OSA server 200 stores a processing performance (for example, a throughput of the CPU, and/or a storage capacity of the working memory) of each terminal device 300, and that (ii) the control section 25 of the OSA server 200 calculates an estimated processing load for a terminal device 300 to which an image processing request is to be transmitted. The image processing system 1 may alternatively be arranged such that (i) the OSA server 200 obtains from a terminal device 300 a run state of the terminal device 300, and that (ii) in a case where the terminal device 300 is being used, the OSA server 200 calculates an estimated delay time for a process being carried out by the terminal device 300.

In the present embodiment, the image processing application execution section 62 (the UI screen preparation section 67) of the terminal device 300 (i) prepares an execution/non-execution selection screen and (ii) causes the display section 51 to display the execution/non-execution selection screen. The present invention is, however, not limited to such an arrangement. Alternatively, the control section 25 of the OSA server 200 may instead carry out control of preparing an execution/non-execution selection screen and causing the display section 51 to display the execution/non-execution selection screen.

The present embodiment allows a user of a terminal device 300 to select on the execution/non-execution selection screen whether to (i) carry out an image processing in response to an image processing request or (ii) hold such carry out of an image processing. The present invention is, however, not limited to such an arrangement. The image processing system 1 may be arranged, for example, such that a user of the multifunction printer 100 can select, in a case where a terminal device 300 is being used, whether to (i) forcibly carry out an image processing in response to an image processing request or (ii) hold such carrying out of an image processing until the process being carried out by the terminal device 300 is completed. The image processing system 1 may alternatively be arranged such that the display section 16 of the multifunction printer 100 displays information indicative of, for example, (i) a run state (use state) of a terminal device 300, (ii) a user using the terminal device 300, and (iii) an application being used at the terminal device 300, so that a user of the multifunction printer 100 can check the run state of the terminal device 300 and thus make the above selection.

The image processing system 1 may further alternatively be arranged such that (i) a user of the multifunction printer 100, in selecting image processing settings, set an indicator (for example, character information such as "urgent", "as soon as possible", and "anytime", or a value indicative of a level of severity) of a severity for an image processing corresponding to an image processing request, that (ii) the control section 19 includes the set indicator in information attendant to document image data and transmits the attendant information to the OSA server 200, and that (iii) the UI screen preparation section 67 of the terminal device 300 includes the indicator of severity in the message 73 on the execution/non-execution selection screen. The image processing execution section 68 of the terminal device 300 may, in a case where the severity is higher than a predetermined standard, carry out an image processing without causing the display section 51 to display the execution/non-execution selection screen.

The present embodiment causes (i) image data of a document scanned by the multifunction printer 100 and (ii) a request of an image processing for the document image data to be transmitted from the multifunction printer 100 via the OSA server 200 to a terminal device 300. The present invention is, however, not limited to such an arrangement. The document image data and the image processing request may instead be transmitted, for example, from the multifunction printer 100 directly to a terminal device 300.

The present embodiment causes (i) image data of a document scanned by the multifunction printer 100 and (ii) a request of an image processing for the document image data to be stored, until an image processing is carried out by a terminal device 300, in the received data storage section 58 of the terminal device 300. The present invention is, however, not limited to such an arrangement. The document image data and the image processing request may, for example, instead be (i) temporarily stored in the storage section 24 of the OSA server 200 until an image processing is carried out or (ii) temporarily stored, until an image processing can be carried out, in the storage section 14 of the multifunction printer 100 so as to be transmitted from the multifunction printer 100 to either the OSA server 200 or a terminal device 300 when it has become possible to carry out an image processing.

The present embodiment causes image processing settings to be selected via the instruction entry section 17 of the multifunction printer 100. The present invention is, however, not limited to such an arrangement. The image processing system 1 may be arranged, for example, such that (i) image processing settings (for example, content of an image processing and settings of various parameters for the image processing) are selected at a second device connected to the multifunction printer 100 via a terminal device 300, the OSA server 200, or a communication network, and that (ii) only placement of a document and an instruction to start a document scanning process are made at the multifunction printer 100.

Further, as described above, each function of the respective control sections 19, 25, and 55 of the multifunction printer 100, the OSA server 200, and the terminal device 300 is realized by software using a processor such as a CPU or the like. In this case, each of the multifunction printer 100, the OSA server 200, and the terminal device 300 includes: a CPU (central processing unit) which executes a control program realizing the functions; a ROM (read only memory) in which the program is stored; a RAM (random access memory) which develops the program; a storage device (storage medium) such as a memory in which the program and various kinds of data are stored; and the like. Further, the object of the present invention can be achieved as follows: a storage medium for computer-readably storing a program code (an execute form program, intermediate code program, or source program) of the control program of each of the multifunction printer 100, the OSA server 200, and the terminal device 300 which is software for implementing the aforementioned functions is provided to each of the multifunction printer 100, the OSA server 200, and the terminal device 300, and a computer (or CPU and MPU) reads out the program code stored in the storage medium so as to implement the program, thereby achieving the object of the present invention.

Examples of the storage medium which satisfies these conditions include: tapes, such as magnetic tape and cassette tape; disks including magnetic disks, such as Floppy Disks® and hard disk, and optical disks, such as CD-ROMs, magnetic optical disks (MOs), mini disks (MDs), digital video disks (DVDs), and CD-Rs; cards, such as IC card (including memory cards) and optical cards; and semiconductor memories, such as mask ROMs, EPROMs, EEPROMs, and flash ROMs.

Further, it may be so arranged that: each of the multifunction printer 100, the OSA server 200, and the terminal device 300 is made connectable to communication networks, and the program code is supplied via the communication networks. The communication networks are not limited to a specific means. Specific examples of the communication network include Internet, intranet, extranet, LAN, ISDN, VAN, a CATV communication network, a virtual private network, a telephone line network, a mobile communication network, a satellite communication network, and the like. Further, a transmission medium constituting the communication network is not particularly limited. Specifically, it is possible to use a wired line such as a line in compliance with IEEE 1394 standard, a USB line, a power line, a cable TV line, a telephone line, an ADSL line, and the like, as the transmission medium. Further, it is possible to use (i) a wireless line utilizing an infrared ray used in IrDA and a remote controller, (ii) a wireless line which is in compliance with Bluetooth Standard® or IEEE802.11 wireless standard, and (iii) a wireless line utilizing HDR, a mobile phone network, a satellite line, a ground wave digital network, and the like, as the transmission medium. Note that, the present invention can be realized by a computer data signal which is realized by electronic transmission of the program code and which is embedded in a carrier wave.

Further, each function of the respective control sections 19, 25, and 55 of the multifunction printer 100, the OSA server 200, and the terminal device 300 is not necessarily realized by software but may be realized by hardware logic. A combination of hardware for carrying out part of processing and operation means executing software for controlling the hardware and carrying out the rest of the processing may be used.

The present invention is not limited to the description of the embodiment above, but may be altered in various ways by a skilled person within the scope of the claims. Any embodiment based on a combination of technical means properly altered within the scope of the claims is also encompassed in the technical scope of the present invention.

Industrial Applicability

The present invention is applicable to (i) an image processing system including an image scanning apparatus and an image processing apparatus communicably connected to each other via a communication network and (ii) an image processing apparatus included in the image processing system.

REFERENCE SIGNS LIST 1 image processing system
32 multifunction printer information storage section (OSA Application Storage Section)
33 control information storage section
34 user information storage section
35 terminal information storage section
42 multifunction printer control section (OSA application execution section)
43 user authentication section
44 operation determination section
45 operation history determination section
46 UI preparation section
47 terminal transfer section
51 display section (display means)
52 instruction entry section (instruction entry means)
53 communication section (communication means)
56 terminal application storage section
57 image processing application storage section
58 received data storage section
59 image data storage section
61 terminal application execution section
62 image processing application execution section
63 processing content detection section
64 attendant condition detection section
65 run state detection section
66 processing load calculation section
67 UI screen preparation section
68 image processing execution section
70 execution/non-execution selection screen
100 multifunction printer (image scanning apparatus, image forming apparatus)
200 OSA server (server)
300 terminal device (image processing apparatus)

The invention claimed is:

1. An image processing apparatus for (i) receiving, from a device connected thereto via a communication network, document image data and image processing request information indicative of content of an image processing to be carried out with respect to the document image data and (ii) carrying out, with respect to the document image data, the image processing corresponding to the image processing request information, the image processing apparatus comprising:

display means for displaying information to be presented to a user of the image processing apparatus;

instruction entry means for accepting an instruction entry from the user of the image processing apparatus;

an image processing section for carrying out an image processing with respect to image data;

a UI (User Interface) screen preparation section for, upon receipt of image processing request information, causing the display means to display an execution or non-execution selection screen for allowing the user of the image processing apparatus to select whether to carry out an image processing corresponding to the image processing request information, when the instruction entry means has accepted from the user of the image processing apparatus an instruction to carry out the image processing corresponding to the image processing request information, the image processing section carrying out, with respect to document image data, the image processing corresponding to the image processing request information; and a processing load calculation section for calculating an estimated processing load caused in a case where the image processing corresponding to the image processing request information is carried out, wherein:

the UI screen preparation section causes the display means to display the estimated processing load, and in a case where the estimated processing load calculated by the processing load calculation section satisfies a preset predetermined condition, (i) the UI screen preparation section does not cause the display means to the display the execution or non-execution selection screen, and (ii) the image processing section carries out, without waiting for the instruction from the user to carry out the image processing corresponding to the image processing request information, the image processing corresponding to the image processing request information.

2. The image processing apparatus according to claim 1, wherein:

the image processing section comprises a CPU included in the image processing apparatus, the CPU executing an image processing application program for carrying out an image processing with respect to image data; and the processing load calculation section calculates an estimated CPU utilization rate as the estimated processing load, the estimated CPU utilization rate being a value estimated of a rate of utilization of the CPU for the case where the image processing corresponding to the image processing request information is carried out.

3. The image processing apparatus according to claim 1, wherein:

the image processing section comprises a CPU included in the image processing apparatus, the CPU executing an image processing application program for carrying out an image processing with respect to image data; and the processing load calculation section (i) calculates an estimated CPU utilization rate, which is a value estimated of a rate of utilization of the CPU for the case where the image processing corresponding to the image processing request information is carried out, and (ii) compares the calculated estimated CPU utilization rate with at least one preset threshold so as to determine, from among a plurality of preset load levels, a load level for the estimated CPU utilization rate in order to calculate an estimated load level as the estimated processing load, the estimated load level being the determined load level.

4. The image processing apparatus according to claim 1, wherein:

the processing load calculation section calculates an estimated processing time as the estimated processing load, the estimated processing time being a value estimated, for the case where the image processing corresponding to the image processing request information is carried out, of a processing time required for the image processing.

5. The image processing apparatus according to claim 4, wherein:

the image processing section comprises a CPU included in the image processing apparatus, the CPU executing an image processing application program for carrying out an image processing with respect to image data; and the processing load calculation section calculates, as the estimated processing time, a value estimated of a processing time for the image processing corresponding to the image processing request information for a case where the user of the image processing apparatus (i) is causing the CPU to carry out a second processing, which is a processing other than the image processing corresponding to the image processing request information, and (ii) causes the CPU to carry out in parallel the image processing corresponding to the image processing request information and the second processing.

6. The image processing apparatus according to claim 1, wherein:

the image processing section comprises a CPU included in the image processing apparatus, the CPU executing an image processing application program for carrying out an image processing with respect to image data; and the processing load calculation section calculates an estimated delay time as the estimated processing load, the estimated delay time being a value estimated of a difference between (A) a first estimated processing time for a second processing, which is a processing other than the image processing corresponding to the image processing request information, for a case where the user of the image processing apparatus (i) is causing the CPU to carry out the second processing and (ii) causes the CPU to carry out in parallel the image processing corresponding to the image processing request information and the second processing and (B) a second estimated processing time for the second processing for a case where the user of the image processing apparatus causes the CPU to carry out the second processing without carrying out the image processing corresponding to the image processing request information.

7. The image processing apparatus according to claim 1, wherein:

the UI screen preparation section causes the display means to display information attendant to the document image data received from the device connected to the image processing apparatus via the communication network; and the attendant information includes at least one of (A) user information indicative of a user who has made an image processing request for the document image data, (B) information indicative of a severity set by the user who has made the image processing request for the document image data, (C) size information indicative of a size of a document in the document image data, (D) document count information indicative of a number of a sheet included in the document in the document image data, (E) resolution information indicative of resolution of the document image data, (F) format information indicative of a format of the document image data, (G) time information indicative of a time at which a scanning process for the document image data was carried out, and (H) information indicative of whether the document in the document image data has an image on each side or on a single side.

8. The image processing apparatus according to claim 1, wherein:

in a case where information attendant to the document image data received from the device connected to the image processing apparatus via the communication network satisfies a preset predetermined condition, (i) the UI screen preparation section does not cause the display means to the display the execution or non-execution selection screen, and (ii) the image processing section carries out, without waiting for the instruction from the user to carry out the image processing corresponding to the image processing request information, the image processing corresponding to the image processing request information; and the attendant information includes at least one of (A) user information indicative of a user who has made an image processing request for the document image data, (B) information indicative of a severity set by the user who has made the image processing request for the document image data, (C) size information indicative of a size of a document in the document image data, (D) document count information indicative of a number of a sheet included in the document in the document image data, (E) resolution information indicative of resolution of the document image data, (F) format information indicative of a format of the document image data, (G) time information indicative of a time at which a scanning process for the document image data was carried out, and (H) information indicative of whether the document in the document image data has an image on each side or on a single side.

9. The image processing apparatus according to claim 1, further comprising:

a run state detection section for determining whether a second processing is being carried out, the second processing being a processing other than the image processing corresponding to the image processing request information, wherein:

in a case where the second processing is not being carried out, (i) the UI screen preparation section does not cause the display means to the display the execution or non-execution selection screen, and (ii) the image processing section carries out, without waiting for the instruction from the user to carry out the image processing corresponding to the image processing request information, the image processing corresponding to the image processing request information.

10. A non-transitory computer-readable storage medium in which a program for causing the image processing apparatus of claim 1 to operate is stored, the program causing a computer to function as each of the sections.

11. An image processing system in which an image scanning apparatus and an image processing apparatus are connected to a communication network, the image scanning apparatus scanning a document so as to obtain document image data, the image processing apparatus carrying out, with respect to the document image data, an image processing corresponding to image processing request information which is (i) prepared in accordance with an instruction from a user of the image scanning apparatus and (ii) indicative of content of the image processing to be carried out with respect to the document image data, the image processing system comprising:

display means for displaying information to be presented to a user of the image processing apparatus;

instruction entry means for accepting an instruction entry from the user of the image processing apparatus;

an image processing section for carrying out an image processing with respect to image data, either the image processing apparatus or a device connected to the communication network including a UI (User Interface) screen preparation section for, when the image processing apparatus has received image processing request information, preparing an execution or non-execution selection screen to be displayed by the display means, the execution or non-execution selection screen allowing the user of the image processing apparatus to select whether to carry out an image processing corresponding to the image processing request information, when the instruction entry means has accepted from the user of the image processing apparatus an instruction to carry out the image processing corresponding to the image processing request information, the image processing section carrying out, with respect to document image data, the image processing corresponding to the image processing request information; and a processing load calculation section for calculating an estimated processing load caused in a case where the image processing corresponding to the image processing request information is carried out, wherein:

the UI screen preparation section causes the display means to display the estimated processing load, and in a case where the estimated processing load calculated by the processing load calculation section satisfies a preset predetermined condition, (i) the UI screen preparation section does not cause the display means to the display the execution or non-execution selection screen, and (ii) the image processing section carries out, without waiting for the instruction from the user to carry out the image processing corresponding to the image processing request information, the image processing corresponding to the image processing request information.

12. The image processing system according to claim 11, further comprising:

a server including:

storing means for storing in association with each other (i) information indicative of a plurality of the image processing apparatus connected to one another via the communication network and (ii) information indicative of image processing which the image processing apparatuses are individually capable of carrying out; and a UI (User Interface) preparation section for preparing a menu screen that is to be displayed by the display means included in the image scanning apparatus and that includes a list of the image processing, which the image processing apparatuses are individually capable of carrying out and the information indicative of which is stored in the storing means, wherein:

either the server or the image scanning apparatus transmits (i) image data of a document scanned by the image scanning apparatus and (ii) image processing request information, indicative of a first image processing which the user of the image scanning apparatus has selected from the list of the image processing and which is to be carried out with respect to said image data of the document, to an image processing apparatus corresponding to the first image processing.

13. An image processing method for use in an image processing system in which an image scanning apparatus and an image processing apparatus are connected to a communication network, the image scanning apparatus scanning a document so as to obtain document image data, the image processing apparatus carrying out, with respect to the document image data, an image processing in response to an instruction from a user of the image scanning apparatus, the method, (A) when the image processing apparatus has received (i) document image data and (ii) image processing request information, indicative of content of an image processing to be carried out with respect to the document image data, causing display means included in the image processing apparatus to display an execution or non-execution selection screen for allowing a user of the image processing apparatus to select whether to carry out the image processing corresponding to the image processing request information, (B) upon acceptance of an instruction from the user of the image processing apparatus to carry out the image processing corresponding to the image processing request information, carrying out, with respect to document image data, the image processing corresponding to the image processing request information, (C) calculating an estimated processing load caused in a case where the image processing corresponding to the image processing request information is carried out, (D) causing the display means to display the estimated processing load, and (E) in a case where the estimated processing load satisfies a preset predetermined condition, (i) not causing the display means to display the execution or non-execution selection screen, and (ii) carrying out, without waiting for the instruction from the user to carry out the image processing corresponding to the image processing request information, the image processing corresponding to the image processing request information.

* * * * *